March 30, 1937.  J. G. ZIMMERMAN  2,075,492
STORAGE BATTERY PLATE
Filed Jan. 9, 1932  4 Sheets-Sheet 1
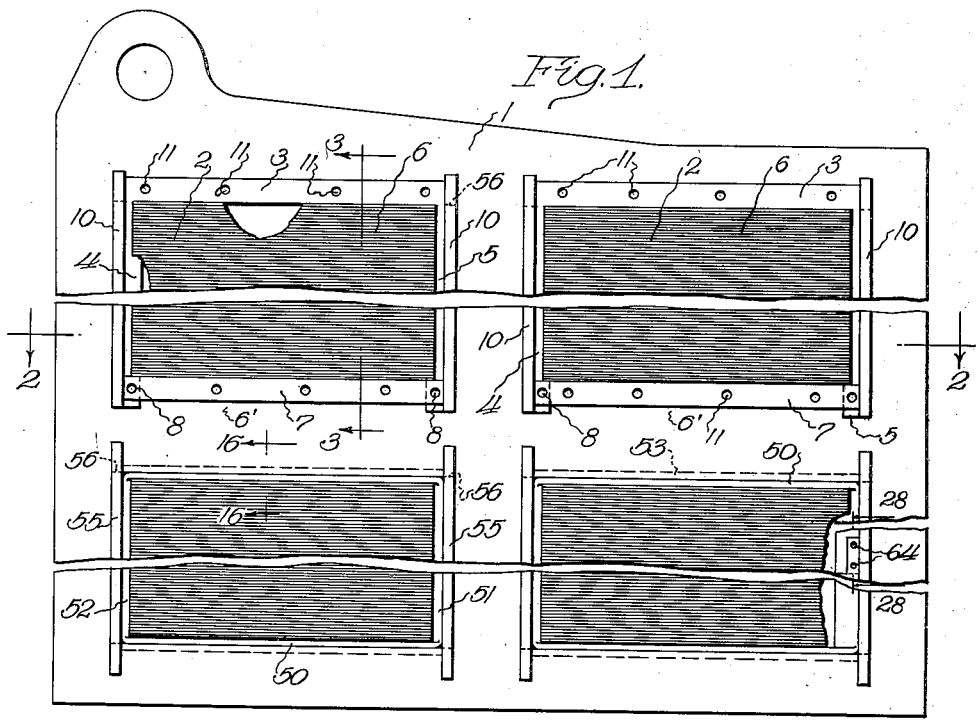
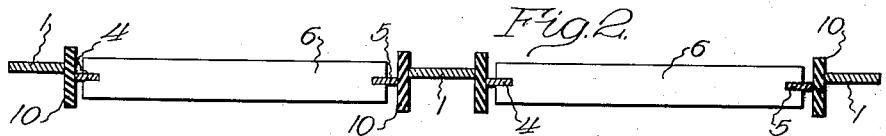
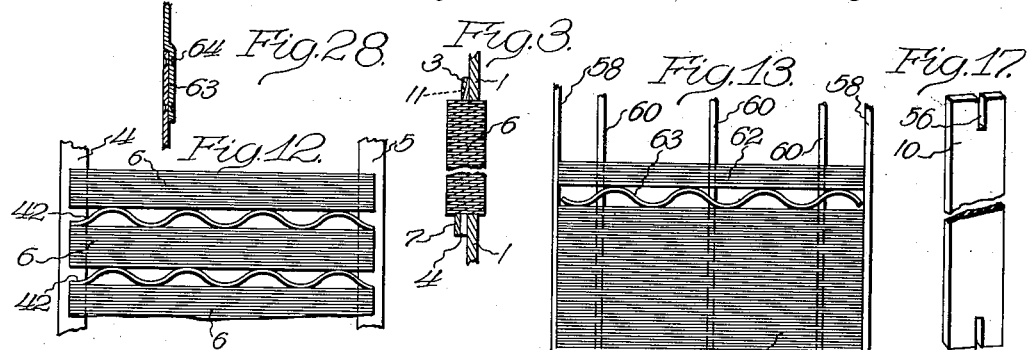
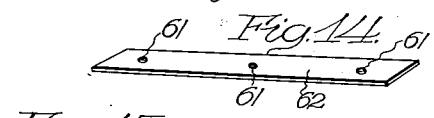
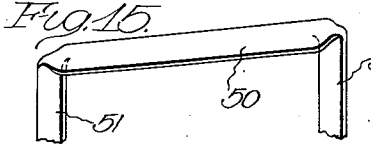
Inventor:
James G. Zimmerman
By Brown, Jackson, Boettcher & Dienner
Attys

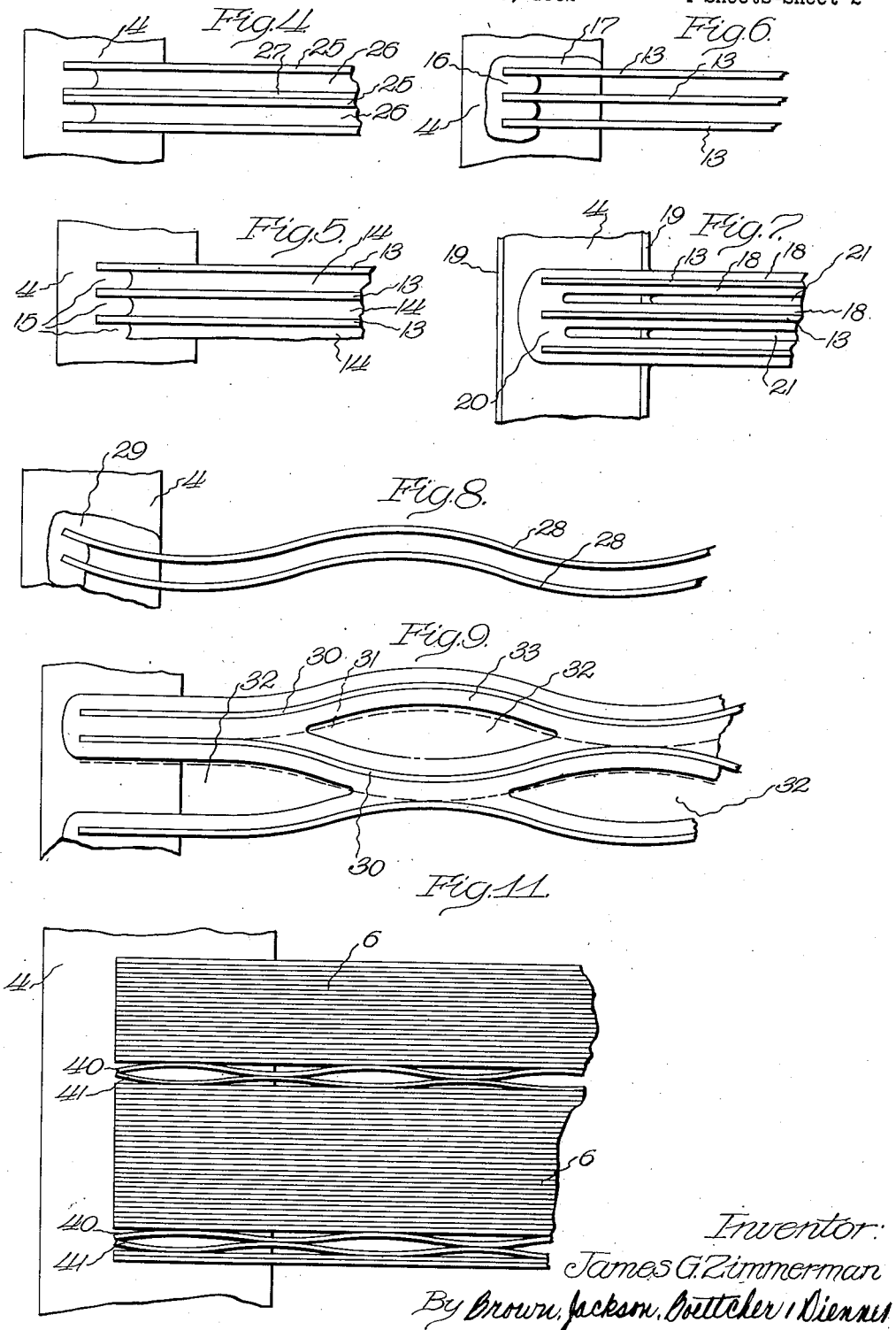

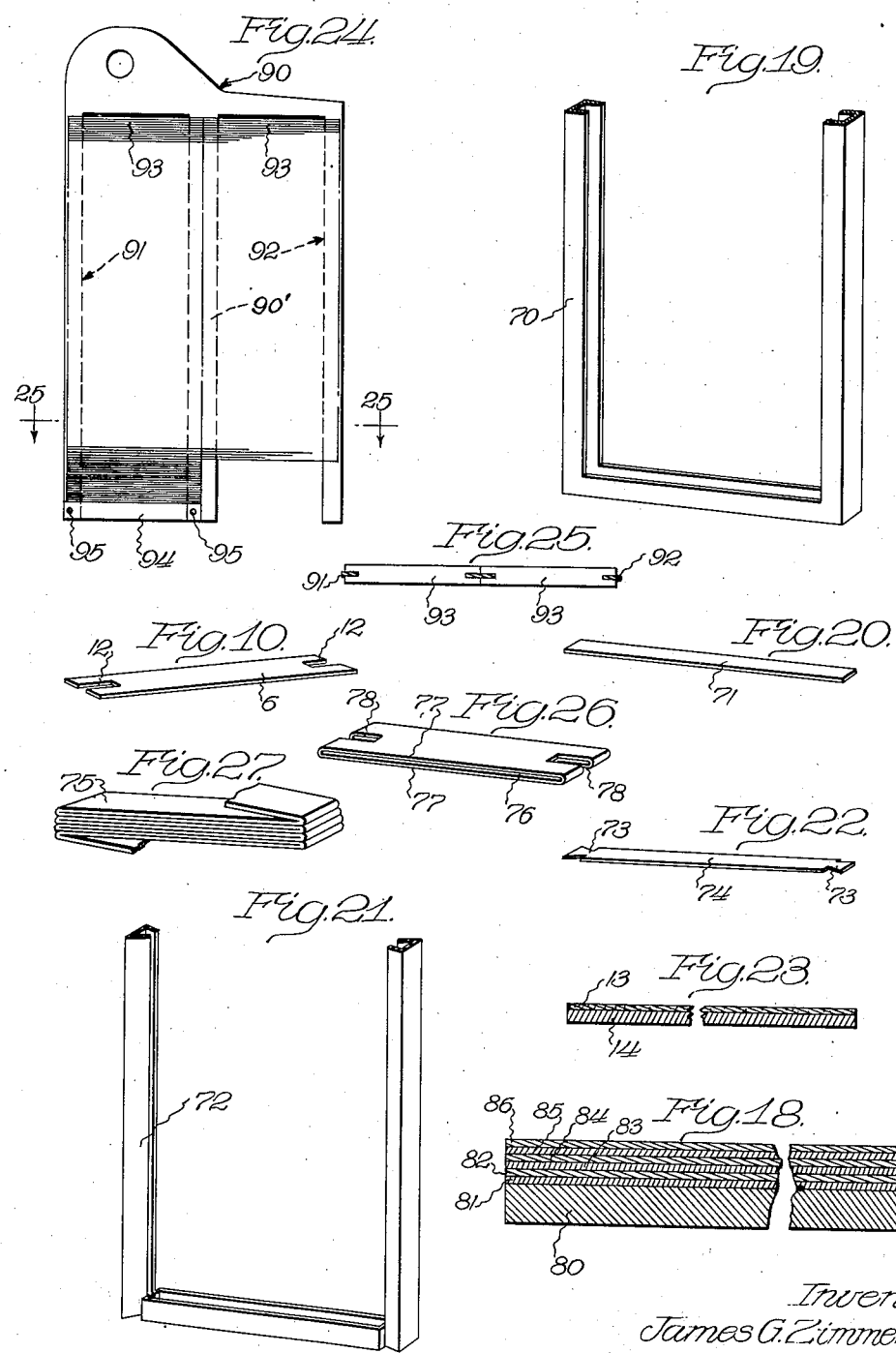

March 30, 1937.　　　J. G. ZIMMERMAN　　　2,075,492
STORAGE BATTERY PLATE
Filed Jan. 9, 1932　　　4 Sheets-Sheet 4

Inventor:
James G. Zimmerman
By Brown, Jackson, Boettcher & Dienner
Attys.

Patented Mar. 30, 1937

2,075,492

UNITED STATES PATENT OFFICE 2,075,492

STORAGE BATTERY PLATE

James G. Zimmerman, Madison, Wis.

Application January 9, 1932, Serial No. 585,670

24 Claims. (Cl. 136—70)

This invention relates to battery plates and a process of making the same.

Nickel-alkali-iron batteries employing an alkali electrolyte are old in the art, and although batteries of this type have established a definite place for themselves, their use has been limited by the inherent characteristics of the cells themselves. My present invention relates to batteries of this type and has for its principal object the production of new and improved battery plates which are not subject to the limitations of the present type of plate, and therefore the field of use of the batteries is extended.

In certain of the prior art batteries, of which I am aware, the positive plate is formed by confining the active material, such as nickel hydrate mixed with flake graphite or alternated in layers with nickel flake, within metallic pockets. In one particular battery the pocket is cylindrical and in another battery rectangular in shape. In either of these prior art plates the accessibility of the active nickel hydrate to the electrolyte is hampered by the perforated container which, although it is liberally supplied with perforations through which the electrolyte may flow, nevertheless restricts the current flow through the electrolyte to an appreciable extent.

Nickel hydrate such as is used in plates of this type is in itself a relatively poor conductor and the devices of the prior art have recognized this fact and sought to correct it in some designs by interspersing layers of flakes of metallic nickel in the nickel hydrate with the result that when the two are tightly compressed together these flakes of nickel form ribbon-like structures which are of relatively good conductivity, and in this manner the poor conductivity of the nickel hydrate is overcome. The layers of packed nickel flakes do not, however, make permanent positive contact with the grid frame as they are not in bonded connection therewith.

Even with this provision the internal resistance of the cell is relatively high due largely to the relative inaccessibility of the active material of the positive plate and consequently the maximum current on discharge and charge of cells of given weight and volume is relatively low.

My present invention has as one of its objects the provision of a new and improved positive plate for battery of this type, a plate in which the ribbons of nickel are solid and are in contact with the frame member to afford a good low resistance electrical path for current in and out of the plate. The active material is bonded to these metallic ribbons and is not encased in a metallic casing, as in the practice heretofore, with the result that the active material is much more accessible to the electrolyte of the battery and the internal resistance is of a cell employing the plate therefore correspondingly low. This results in an appreciable increase in the maximum rate of charge and discharge that the plate can stand without injury. Furthermore, since the active material is all in intimate contact with the electrolyte, all of it can be converted during the cycle of charge and discharge, and the watt hour capacity per unit weight and volume is high.

In the prior art cells of which I am aware negative plates have been formed by confining a quantity of iron oxide in a perforated metallic container and supporting that container in a suitable framework to form a plate. These negative plates are subject to the same criticism as the positive plates, namely, that the active material is encased in a metallic container which, although it is perforated, nevertheless obstructs the free flow of current and electrolyte in and out of the active material.

The plate structure of my invention may be used as a negative plate as well as a positive plate by depositing on it or adding thereto the proper active material, as will presently appear. With both the positive and negative plates of a battery composed in such a manner that electrolyte and current can freely flow in and out of the active material, and so that the active material is of large area and thin section, the cell is very efficient and the field of usefulness of the battery is materially increased.

As is well understood by those skilled in storage battery art, the usefulness of a battery depends to a great extent upon its ability to accept a charge or to discharge itself at a relatively high rate. Where the period is short in which to charge the battery or to deliver the charge from the battery, the size of cell required for any given capacity is a function of its limiting rate of charge or discharge. It is apparent, therefore, that for vehicle propulsion and the like, where a heavy battery interferes with the pay load capacity of the vehicle, a battery of high charging and discharging rate capacity is obviously desirable. Batteries of the prior art to which this invention relates do not meet these desirable characteristics and the use of the battery in certain fields has therefore been an impossibility. The improved plate structure of my invention, by exposing a substantially greater area of active material to the electrolyte of the battery, overcomes the most serious objections to batteries of this type, and achieves a battery capable of higher discharge and charging rates than has been possible heretofore. The use of the plates of my invention, therefore, opens to the nickel-alkali-iron type of cell, fields in which it has heretofore been unsuccessful.

With high discharge and charging rates a considerable amount of heat is developed in the plates of a battery and as a further object of my invention I have provided arrangements for compensating for the expansion of the current-carrying elements of the plates, so that the plate structures will not be injured by expansion and contraction as they are alternately heated and cooled. Such provision for expansion also provides for any pressures developed due to changes of volume of the active material should they occur.

The electrolytic action occurring within a cell constructed in accordance with the teachings of my invention is the same as heretofore and I do not claim this action as a part of my invention except as will hereinafter appear.

Further objects of my invention will be apparent from a reading of the detailed description and claims which follow, reference being had to the accompanying drawings in which a preferred embodiment of it is shown by way of example, and in which:

Figure 1 is a fragmentary plan view of a battery plate constructed in accordance with the teachings of my invention;

Figure 2 is a cross-sectional view taken along the line 2—2 of Figure 1 looking in the direction of the arrows;

Figure 3 is a cross-sectional view taken along the line 3—3 of Figure 1 looking in the direction of the arrows;

Figure 4 is a fragmentary diagrammatic view illustrating the construction of the active material unit;

Figure 5 is a view similar to Figure 4 illustrating a preferred method of constructing the active material unit;

Figure 6 is a fragmentary view illustrating a further step in the process of forming the active material unit;

Figure 7 is a fragmentary view of the completed active material unit;

Figure 8 is a fragmentary view of the active material unit illustrating one use of serpentine webs;

Figure 9 is a fragmentary view of the active material unit employing the preferred adaptation of serpentine webs;

Figure 10 is a perspective view of the web employed in Figures 1 to 7, inclusive;

Figure 11 is an elevational view drawn to an enlarged scale showing the introduction of serpentine expansion members in an active material unit;

Figure 12 is a view similar to Figure 11 showing another form of serpentine expansion members in a unit;

Figure 13 is a fragmentary elevational view illustrating a slightly modified form of active material unit;

Figure 14 is a perspective view of the web used in the embodiment shown in Figure 13;

Figure 15 is a fragmentary perspective view of a modified form of framework;

Figure 16 is a fragmentary cross sectional view taken as along the line 16—16 of Figure 1 and illustrating the method of attaching the web frame of Figure 15 to the plate frame;

Figure 17 is a perspective view of a separator used in the plate shown in Figure 1;

Figure 18 is a fragmentary cross sectional view illustrating the formation of the stock from which the webs shown in Figures 10, 14, 20 and 21 may be formed;

Figure 19 is a perspective view of a modified form of unit frame;

Figure 20 is a perspective view of the web employed in the frame of Figure 19;

Figure 21 is a perspective view of another form of active material unit frame;

Figure 22 is a perspective view of the web employed in the frame of Figure 21;

Figure 23 is a cross sectional view showing a modified form of the web stock;

Figure 24 is an elevational view of a plate in which the webs are mounted directly upon the plate frames;

Figure 25 is a cross sectional view taken along the line 25—25 of Figure 24;

Figure 26 is a perspective view of a modified form of web such as may be used in the framework of Figures 1, 15 and 24;

Figure 27 is a modified form of web that may be employed in the framework shown in Figure 19;

Figure 28 is a fragmentary cross sectional view taken along the line 28—28 of Figure 1 and showing the details of the joint between the unit frame members.

Figure 29:
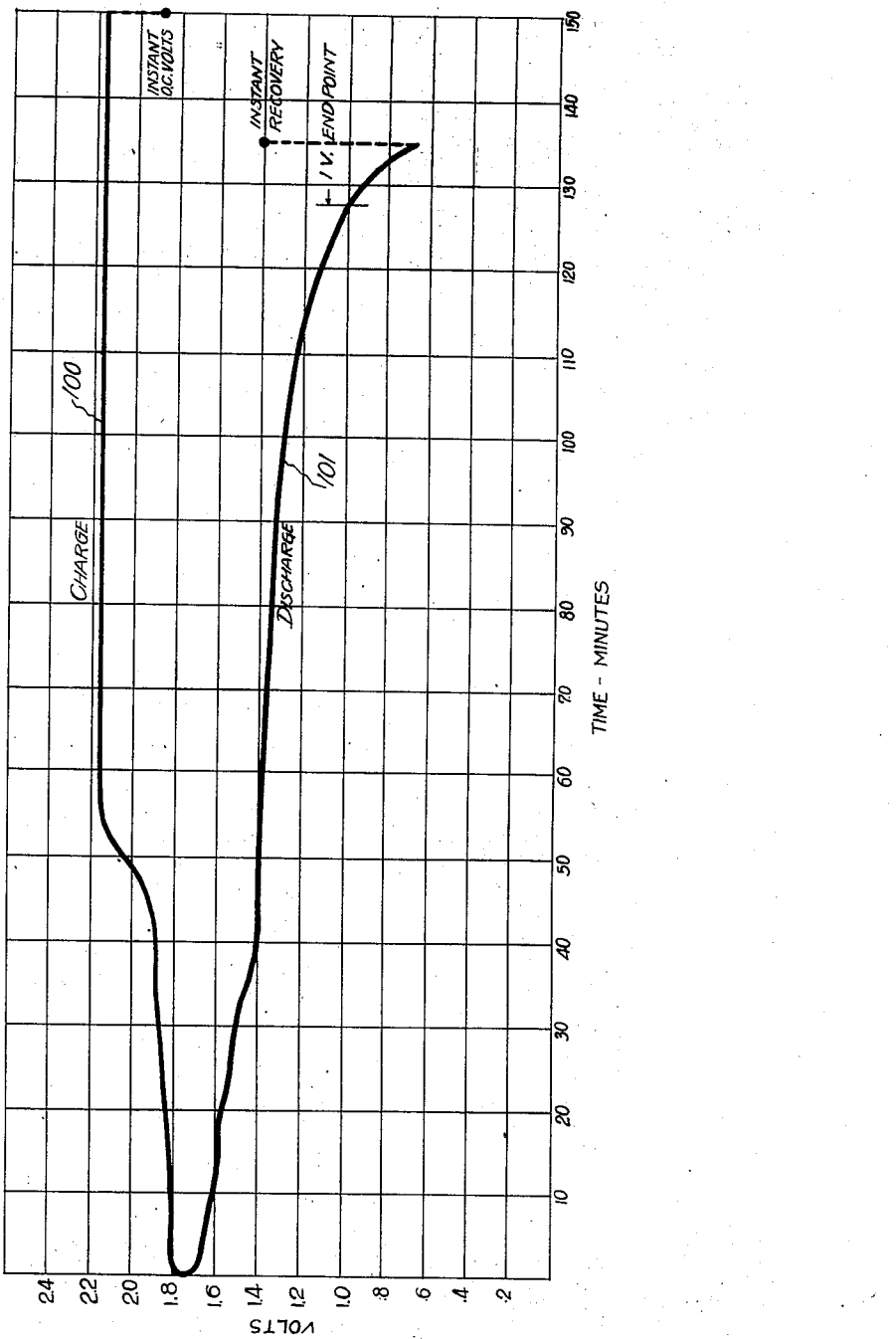
Figure 29 is a graph indicating the performance characteristics of one form of cell of my invention.

Referring now to the drawings in more detail, the plates of my invention preferably consist of a sheet metal frame 1 containing a plurality of substantially rectangular openings whose area constitutes the major part of the frame area. As shown in Figure 1, there are four of these openings, this number obviously being chosen for purpose of example only as the frame may be provided with a larger or smaller number of openings as required.

Fitted within each one of these openings is an active material unit indicated generally at 2 in Figure 1 which unit, when constructed in accordance with the teachings of my invention, maintains the active material of the plate in ready contact with the electrolyte in a cell.

Preferably each unit consists of a U-shaped frame having a closed end 3 and side members 4 and 5 which terminate in an open end, this frame preferably being a sheet steel stamping, although other suitable metals or alloys such as Monel metal and other forms of fabrication may be used if desired.

Mounted within the frame thus formed are a plurality of thin metallic ribbons indicated generally at 6 in Figure 1, these ribbons being uniformly spaced over the entire area of the unit frame to receive the active material of the plate, as will presently appear. After all of these ribbons have been placed in the frame, a closing member 7 is placed across the open end of the frame and attached there in any preferred manner such as by welding at points 8. The unit thus formed is compact and self-supporting and contains a relatively large active material area for given dimensions and volume. As will be seen in Figure 2, the ribbons 6 of the unit project laterally beyond the side members 4 and 5 of the unit frame and also beyond the plate frame 1 on opposite sides of that frame, that is, the unit is thicker than the frame.

These units 2 are manufactured separately from the frame 1 and inserted in the frame upon their completion. To provide for separation of the plates thus formed from the opposite plate of the battery, I may conveniently provide insulating strips 10 shown in detail in Figure 17, which fit into the opposite sides of the openings in the plate 1, the strips 10 being slotted at their ends to permit them to be overlapped with the plate 1 at the ends of the openings. The unit 2 fits between these insulators 10, and binds them in place in the plate frame, and as will be seen in Figure 2, these insulators 10 project beyond the free edges of the active material ribbons 6 and are therefore in position to maintain proper spacing between the plates of a battery, as will presently appear. In assembling the insulators 10 in the frame 1, the insulators are bent sufficiently to permit them to be sprung into place in the openings, and when so positioned, and the active material unit 2 is positioned in the opening, the insulators 10 are rigidly and securely held in place on the framework. These insulators, being vertical in position, do not permit the formation of gas pockets on their under sides, as do horizontal insulators, and as a consequence, loss of area of active material in working contact with the electrolyte is avoided.

Preferably the active material frame consisting of members 3, 4, 5 and 7 is attached to the frame 1 of the plate in any preferred manner such as by clamping, welding or soldering with suitable binders. In Figure 1, electric welding is used as shown at 11. This method allows establishing a bonded contact of low electrical resistance, which contact can be made with little effect on the balance of the plate while under process.

A preferred form of the ribbons 6 of the active material unit 2 is shown in Figure 10. It will be seen that this ribbon comprises a thin relatively long and relatively narrow metallic ribbon having slots or indentations in its opposite ends, these indentations being registered with the side frame members 4 and 5 of the unit frame during the assembly of the unit. Preferably the webs 6 are formed from stock which in section is shown in Figure 23 and comprises a thin layer of metallic nickel 13 formed on a metallic ribbon 14, which ribbon 14 may be aluminum, zinc or copper, upon which nickel may be easily deposited electrolytically. In practice the overall thickness of the stock with the thin layer of nickel thereon from which these webs are made is of the order of about 0.005 of an inch and the nickel layer is of the order of 0.0005 of an inch thickness. These dimensions may obviously be changed within the teachings of my invention, and if desired other combinations of metals may likewise be used.

Referring now to Figures 5, 6, and 7, it will be seen that the individual webs 6 are assembled on the framework members 4 and 5 of the unit frame with the layers of nickel 13 of the one web abutting against the layer 14 of aluminum, copper, etc., of the adjacent web as shown in Figure 5. By this arrangement the space within the unit framework may be completely filled by webs and these webs securely clamped therein by the addition of the closing member 7 as previously explained. No great amount of pressure need be exerted on the webs by the member 7.

After this assembly has been completed, the ends of the webs 6 abutting the side rails 4 and 5 of the framework are treated chemically sufficiently to dissolve out the aluminum or other base metal, such as zinc or copper, by any suitable means or method, as by immersing the active material unit assembly in an acid or alkaline solution which will dissolve the base metal, aluminum, copper, zinc, etc., preferentially to the nickel, as indicated at 15 in Figure 5, thus leaving the nickel strips 13 spaced apart at their ends, which ends overlap the side rail 4 as shown.

The next step in the process of manufacture of the active material unit consists in bonding part or all of the nickel ribbons 13 to the frame members 4 and 5. This bonding may be accomplished by depositing a mass of metal 16 in the pockets 15 formed between the ends of adjacent strips of nickel 13. This deposit may be made in any preferred manner such as, for example, by electroplating or by spraying hot metal into the pocket by the usual and well known Schoop process. Regardless of the particular method used the space between the adjacent nickel ribbons is preferably completely filled with metal 16 and the ends of the ribbons abutted on the side rails 4 and 5 of the framework are quite generally covered with this metal as indicated at 17 in Figure 6. This securely attaches a majority of the thin nickel ribbons to the framework, and the connection thus formed is of low electrical resistance. Those ribbons 13 which may not be rigidly bonded to the frame are nevertheless held in good electrical contact therewith. Loose members are apt to be loose at one end only, leaving the ribbon still in bonded contact with the frame.

With the completion of the bonding of the ribbons to the frame members or side rails 4 and 5, the unit is completed mechanically and preferably is inserted into the frame 1 before further treated, although if desired it may be processed before insertion. The former affords a more desirable condition of the unit for handling and less damage to the ribbons results.

In either event, the unit is finally treated chemically or electrochemically by exposing the entire unit assembly as an anode in an electrolyte which will cause the base metal to dissolve preferentially to the nickel, or by both methods, and/or together with other methods, to remove the carrier strips 14 of the webs leaving spaced ribbons or webs of neutral metal 13, as indicated in Figure 6, or to substitute for the carrier strips other metals or active materials. Likewise, the nickel or other neutral metal strips may be partially converted into active material after removal of the carrier metal. Obviously if the strips 14 are aluminum or zinc as mentioned above, they can be chemically removed without affecting the nickel strips 13. As previously mentioned the nickel ribbons 13 are preferably approximately 0.0005 of an inch thick and the aluminum that has been dissolved out was of a thickness equal to the difference between the overall thickness of about 0.005 of an inch and the 0.0005 of an inch thickness of the aluminum layer or approximately 0.0045 of an inch thick so that the space between adjacent nickel webs is approximately 0.0045 of an inch.

The chemical removal of the aluminum, zinc or copper strips may be accelerated by covering the nickel-plated or coated strips with an enamel or varnish prior to assembly. In such case, each web would have layers of three different materials, i. e., the aluminum, zinc or copper base metal, upon which is the coating or plating of nickel covered with a layer of enamel or varnish.

When such webs are assembled, the varnish or enamel layers hold the other layers apart a distance equal to the thickness of the enamel or varnish, and, after assembly, the varnish or enamel is dissolved out by application of a suitable solvent. This leaves spaces between the webs equal to the thickness of the varnish or enamel layers and, as a result, upon application of the solution for dissolving out the aluminum, zinc or copper base metal, this solution comes into contact not only with the edge or edges of the base metal, but also into contact with the exposed face of the base metal which is presented to the next adjacent web. This procedure is further advantageous in that it increases the thickness of the spaces between the aluminum layers, and this increased thickness may be used to provide expansion spaces in the finished plate, as will presently appear.

The grid thus formed is now ready for application of the active material itself, and this material may be applied in any one of a number of ways within the teachings of my invention. For example, as shown in Figure 7, a thin coating of active material metal may be deposited upon the ribbon 13 electrolytically as indicated at 18 in the figure. This coating covers both sides of the ribbons 13 and also covers the frame member 4 as indicated at 19, and the bonding material 16 as indicated at 20. The thickness of the coating of active material thus applied is carefully regulated and the application of the coating is stopped before the metal thus applied closes the space between adjacent nickel ribbons 13. This leaves a space 21 between adjacent strips or webs of active material on the unit, this space 21 in effect making the plate 4 porous and permitting the electrolyte of the cell to freely come into intimate contact with the active material on the plate since the spaces extend completely through the plate structure. The coating 18 applied to the ribbons of nickel 13 of the frame is composed of metal, such as for example silver, which is subsequently converted to oxide of that metal, as for example silver oxide, by electrolytic action when the plate is charged in the presence of the electrolyte of the battery. If desired the active material may be applied in its oxidized form by direct application by any suitable process such as "pasting". Or, it may be formed by chemical replacement using for example, the replacement of aluminum or zinc of the original spacer metal or later applied by electroplating on the prepared nickel ribbons by immersing the plate into a suitable solution of nickel salts or silver salts. The spaces 21 between adjacent ribbons of active material also serve as expansion receivers so that as the active material expands upon oxidation, or upon heating, or both, it can expand into these spaces without damage to the unit.

It will be understood of course that the illustrations in Figures 5 to 7, inclusive, are magnified greatly to more clearly illustrate my invention.

While it is preferable to form a ribbon of nickel, such as the ribbon 13, on one side only of the carrier metal as illustrated in Figure 23, in certain instances it may be advantageous to form such ribbons on both sides of the carrier metal, and in Figure 4 I have illustrated webs of this type. It will be noted that the webs are threaded upon the frame 4 as before, and comprise a ribbon of nickel 25 deposited on one side of a ribbon of carrier metal 26 and a second ribbon of nickel 27 deposited on the other side of the metal 26. When assembled in the framework the ribbon 25 of one web abuts the ribbon 27 of the adjacent web so that when the carrier metal 26 is dissolved out of the assembly, that assembly comprises a single ribbon of nickel spaced from two ribbons of nickel which lie against each other. When the active material is deposited upon the webs thus formed the spaces such as space 21, Figure 7, will intervene only between alternate ribbons of active material. The method of bonding the ribbons of nickel to the framework 4 is the same as hereinbefore explained and need not be repeated.

In certain instances active material units may be constructed from unplated flat strips formed in the manner shown in Figure 10 and assembled in frames in the manner indicated above. To accomplish this a group of webs 6 are punched from a thin ribbon of zinc, or other equivalent base metal, and a similar group of webs 6 are punched from a thin ribbon of nickel. These webs are stacked alternately, that is a zinc is placed between two nickel webs, in the unit frame. The webs are attached to the frame as before and the zinc webs then dissolved out chemically or converted into active material by a chemical replacement process. This method of assembly insures uniform thickness of the nickel webs since the stock from which they are punched can be accurately regulated as to thickness. The spacing of these nickel webs is regulated by regulating the thickness of the base metal stock from which the spacing webs are formed.

The webs 6 shown in Figure 10 and applied to the framework of the unit in the manner illustrated in Figures 4 to 7, inclusive, are flat planar members. In certain instances it may be advantageous to form these webs of serpentine members, and in Figure 8 I have illustrated such a construction in which the ribbons of nickel 28 are shown after the carrier member has been dissolved out. The ribbons are bonded to a frame 4 by bonding metal 29 in the hereinbefore explained manner. Preferably, however, serpentine ribbons are employed in a slightly different manner as is illustrated in Figure 9. In this construction, the web stock consisting of metal ribbons 30 and carrier metal 31, indicated by the dotted line, are formed serpentine and assembled so that they curve alternately toward and away from each other, thus forming a series of generally elliptical pockets 32 which are staggered over the surface of the unit. After the carrier metal 31 has been dissolved out, and the active material 33 is deposited upon the webs 30 as in the hereinbefore explained manner, the openings 32 are partially but not completely filled with active material and as a result the plate thus formed is highly porous and the electrolyte of the cell may readily penetrate through it. This construction is further advantageous in that the supporting webs and active material carried thereby are slightly flexible and therefore may exand and contract upon heating and cooling of the plate without damage to the plate.

In Figures 11 and 12 I have shown active material units built up to include expansion members. As shown, a plurality of webs 6 are assembled upon a framework 4 as before, and at spaced intervals serpentine webs 40 and 41 are disposed so that they curve alternately toward and away from each other. These webs 40 and 41 may be composed of springy metal which is also capable of receiving a coating of active material so that their presence will add to the effective surface area of the active material. The construction shown in Figure 12 is the same except that a single serpentine member 42 is interposed between adjacent stacks of webs 6. The webs 6 shown in Figure 12 are preferably formed and assembled in the manner hereinbefore pointed out in connection with Figures 5 to 7, inclusive, and coated with an active material. Although the opposite ends of the webs 6 are bonded to the framework members 4 and 5, no damage results to the webs and active material by their expansion and contraction during heating and cooling or due to any changes in volume of the active material during charging and discharging since they are sufficiently flexible to permit some movement even though they are fastened at their opposite ends.

Obviously, the specific details of construction of the unit may be varied greatly within the teachings of my invention. In Figure 15 I have shown a modified form of frame in which the closed end 50 is formed in a plane at right angles to the side rails 51 and 52 so that when webs such as 6 are assembled upon the frame the end member 50 supports these webs throughout their entire area. In assembling a frame of this type in the frame 1 of the plate, the edge of that frame adjacent the opening into which the unit is to be placed is bent over as at 53 in Figure 16 and the end member 50 of the unit frame is welded as at 54 and 54' to the projecting ends. This forms a convenient manner of attaching the unit to the plate frame and at the same time affords ample protection to the end ones of the webs in the active material unit. This method of construction also affords advantages in the way of increased active material surface. The plane area of the plate that is ineffective is reduced and the number of webs increased over the flat method of attaching the units to the frame. Spacing insulators 55 may be inserted as before. These insulators are similar to the insulators 10 hereinbefore explained, except that the slots 56 in their ends are not offset from their median lines since the active material unit is centered in the plane of the plate frame, instead of offset in the manner shown in Figure 3 and hereinbefore explained.

In certain other instances, the frame may consist of a U-shaped metallic member 58 (Figure 13) disposed with its end 59 and side rails 58 all set on edge, and provided with a plurality of wire-like rods or members 60 which project through openings 61 in the webs 62 shown in Figure 14. Serpentine expansion members 63 may be used in this form of unit as before.

To illustrate the various forms of units that may be employed within the teachings of my invention, the lower two units of Figure 1 are shown as constructed in the manner shown in Figures 15 and 16, these units being composed of two frames as shown in Figure 15, set with their open ends adjacent and having those open ends overlap as shown at 63 in Figure 28 and welded as at 64 to close the unit. By overlapping the frames in the manner as shown, the webs are maintained in accurate alinement and not offset because of the lapping.

The frame of the unit may also conveniently be made as a channel section disposed with its open face inward as shown at 70 in Figure 19. The open face of the channel affords a convenient manner of alining the webs, which as shown in Figure 20 are preferably lapped square ended ribbons 71, each ribbon being composed in the manner shown in Figure 23 and hereinbefore explained. Obviously suitable serpentine spreaders may also be used in a unit frame of this type to allow for expansion and contraction of the unit upon heating and cooling. A frame of this type is fitted into a plate frame, such as 1 and welded therein.

In certain other instances, a channel frame 72, such as shown in Figure 21, may be used. In this frame the channel members have their free edges bent inwardly to form dovetails into which the dovetails 73 of the webs 74, Figure 22, register and are held in place. The webs used in the frames shown in Figures 19 and 21 are bonded to the inside surface of the channel in any convenient manner such as by electroplating a suitable bonding metal thereon.

The channel-like frame 70 lends itself well to the forming of a folded web section such as is shown in Figure 27, this web being composed of a ribbon 75 folded back and forth upon itself to form a stack. The ribbon is of such width that it accurately fits inside of the channel faces and is folded to such length as to accurately fit between the side rails of the frame. The stock from which the folded web 75 is made is preferably a bimetallic stock such as is shown in Figure 23, and the carrier metal is dissolved out after the webs have been bonded to the frame, in the hereinbefore explained manner, to provide space for the reception of active material.

The webs used in the U-shaped frame shown in Figures 1, 2, 12 and 15 may also be formed in the manner indicated in Figure 26. A strip of carrier metal 76 is plated on both of its sides to form a ribbon 77 which completely encircles it. Slots 78 are punched and in assembly registered with the side rails of the U-shaped framework, and bonded thereagainst in the hereinbefore explained manner. After this is completed the carrier metal 76 is dissolved out and the webs then consist of two parallel thin ribbons of neutral metal such as nickel upon which the active material is deposited.

While the web stock preferably consists of a bimetallic strip it may conveniently be of a polymetallic strip as shown in Figure 18 consisting of a carrier metal 80, such as aluminum for example, upon one surface of which is deposited a coating of nickel or other suitable metal 81. Deposited on this coat 81 is a coat 82 of base active metal, silver for example, and upon this a coating 83 of carrier metal such as zinc or copper is deposited. The series of metals as just have been described as deposited upon the carrier metal aluminum may be repeated a number of times to build up the stock material from which the webs are stamped as for the bimetallic metal process. The order of metals is plated as follows: nickel, silver, zinc, nickel, silver, zinc etc. until the desired number of layers are formed. By using an arrangement of this type, each web provides a plurality of thin ribbons of neutral metal, namely, 81, 84 and 87: a plurality of active base metal, 82, 85 and 88 and a plurality of carrier metals 80, 83 and 86. After assembling in the grid unit and plate frame the carrier metals aluminum and zinc or copper are dissolved out, leaving the plurality of nickel webs or ribbons holding the active base metal ribbons for forming the active material on charging and spaces are provided formerly occupied by the carrier metal for porosity and expansion of the active material. This greatly enlarges the active material area and reduces the thickness of the active material, both being vital factors in storage cell constructed for gaining activity and efficiency of the active material content of the plate, known in the art as the "coefficient of utilization".

In the description thus far the webs have been assembled upon a unit framework or grid which is subsequently attached to a plate framework to form the battery plate. This obviously is advantageous in that it permits manufacture of a standard size active material unit and the manuture of battery plates of various sizes by inserting varying numbers of these active material units in a suitable framework. In certain other instances it may be advantageous to assemble the webs directly upon the plate framework and in Figure 24 I have shown a unit of this kind. The plate framework 90 is provided with or includes portions serving as a pair of U-shaped frame sections 91 and 92 having a common central leg 90. A plurality of webs 93 are assembled in these frames, those webs preferably being of the type shown in Figure 10 or Figure 26. The open ends of the sections 91 and 92 are closed by a suitable member 94 welded as at 95 to the ends of the frame to hold the webs in place. Suitable serpentine members such as 40, 41 or 42 may obviously be inserted to allow for expansion and contraction of the active material and charging and discharging of the plate. Figure 25 shows a cross section of the plate constructed in this manner taken along the line 25—25 of Figure 24. It will be noted that the active material units 93 completely cover the surface of the plate so that a very large proportion of the surface area of the plate is occupied by active material. This is obviously advantageous.

If desired, serpentine webs arranged in the manner shown in Figure 8 or 9 may be used in a framework of this type and the advantages inherent in this type of construction will thereby be achieved.

In the description thus far silver has been from time to time mentioned as an active material. I have found that with a positive plate consisting of silver as a base active metal and a negative plate of iron oxide or a mixture of iron and cadmium oxides in an alkaline electrolyte, satisfactory results can be achieved. Silver may be deposited upon the webs of the positive plate by elecroplating, this method being advantageous as the thickness of the coating of silver may be accurately regulated in the usual manner, and the spaces between adjacent webs may be only partially filled so that in the completed plates openings will remain so that the electrolyte will come in intimate contact with the active material over the entire surface of the web.

It is not necessary to place the silver on the webs by electroplating as above mentioned and if desired silver oxide can be deposited directly by the usual mechanical processes. Nor is the use of sliver as an active metal necessary in all instances. Nickel oxide may be used and this lends itself to formation by partial conversion of the nickel ribbons into active material by chemical or electrochemical methods. Chemical replacement methods may also be used. By using aluminum or zinc as a carrier metal in the bimetallic or polymetallic strips forming the webs, the carrier metal can be replaced by chemical reactions in a nickel sulphate solution acidified and hot.

During the charging of the cell, silver is converted first to silver oxide and as the charging increases, to silver peroxide. On discharge this peroxide is reduced to oxide and eventually to metallic silver again. Obviously the battery is fully charged when all of the metallic silver is converted to silver peroxide and by making the layer of silver on the webs sufficiently thin this complete conversion can be achieved within a reasonable length of time and the plate is therefore most efficient. Obviously if the layer of silver is too thick difficulty will be experienced in converting the innermost portion of it to silver peroxide since oxygen cannot readily reach the under layer of silver because of the presence of the superficial layer of peroxide which protects the underlying metal. Metallic silver oxidizes much more readily than the oxides. With an excess of silver in the plate the efficiency of the cell is thus reduced and added weight is placed in it without adding any beneficial results to the cell. The watt hours output per pound of plate is obviously highest when all of the active material is converted to an oxide during the charging of the battery.

If desired, the active material may be silver oxide which is prepared as a powder and deposited on the webs of the positive plate by a filtration process. This process, frequently referred to as a filter press method, is well known in the art and consists essentially in deposition of material from a suspended solution by delivering the solution to the part receiving the material, which part is disposed on a filter bed which permits the suspending liquid to pass through, leaving the deposited material behind. Since the webs are spaced close together the material so applied will be rigidly held in the plate and shedding of active material from the plate will be negligible. The space between adjacent webs will be completely filled but since the active material is applied in a powder form the resulting plate will be somewhat porous and the electrolyte will penetrate rapidly to the innermost sections of the active material. If desired metallic silver may be mixed with the silver oxide thus applied, which silver is later converted to oxide. Silver oxides reduce in volume as they are reduced to silver and the porosity of the plate is thereby increased. Agents such as ceric oxide, for example, may be mixed with the silver oxide if desired.

In, Figure 29, I illustrate the charge and discharge characteristics of a cell formed in accordance with the teachings of my invention and employing silver as a base active metal in the positive plate and iron oxide as an active metal in the negative plate, in an alkaline electrolyte. Curve 100 illustrates the charging voltage characteristic of the cell when charged at a two hour rate. Under these severe conditions the cell shows an average voltage of 2.045 volts and an open circuit voltage of 1.88 volts when fully charged. Curve 101 illustrates the discharge characteristic of the cell under the same conditions. The cell has an average discharge voltage of 1.38 volts when delivering one ampere and an open circuit voltage of 1.4 volts at the end of the discharge period. The charge current of this cell was 2.5 ampere hours and the discharge current 2.13 ampere hours, resulting in an ampere hour efficiency of 85%. The watt hour efficiency of the test was 57.4%. From this data it will be seen that the cell of my invention performs creditably under severe heat conditions.

Silver as such is rather more expensive than nickel or nickel oxide and it might appear that the cost of cell or plate would be made unduly high through its use. However, because of the reduced cost of handling the metal in the fabrication of the plate, the final cost of manufacture compares very favorably with the corresponding cost of the present plates, that is, the added cost of the base metal is offset by the savings entailed in the process of manufacture. The cost is further reduced by the increased efficiency, since less metal is required per unit output.

It is to be understood that my invention is not confined to the use of silver as an active material. Nickel oxide may be used as a positive plate material, this material being applied as metallic nickel and converted to nickel oxide by the usual and well known processes. Furthermore, if desired, a coating of zinc may be applied to the nickel ribbons of the webs and converted to nickel oxide or nickel metal or a mixture of oxide and metal by the chemical reactions resulting from a treatment of the plates in a solution of hot acid nickel sulphate, depending upon the acidity. These reactions result in the depositing of a nickel oxide on the plate and a dissolving of the zinc from the webs, which zinc enters into the acid solution in which the plate is being treated.

The positive plates thus formed may be used with the usual form of negative plates now commercially available in cells of this type. These plates contain perforated pockets in which is deposited a quantity of iron oxide or a quantity of iron oxide to which a small amount of mecuric oxide is added or a mixture of iron and cadmium oxides. The cell resulting from a combination of these two plates will be superior to the nickel alkali iron cells now available; however, maximum results will not be achieved by this combination of plates.

The plate structure consisting of the framework and webs of nickel or other suitable neutral metal, may also be used as a negative plate by depositing iron upon the nickel webs which iron is converted to iron oxide in the usual manner. The deposit of iron is regulated so that the resulting plate has openings 21 between adjacent coatings of active metal as shown in Figure 7 or elliptical openings 32 as shown in Figure 9 if serpentine webs are employed, and the electrolyte will therefore be able to penetrate deeply into the plate and maximum efficiency is thereby insured. A mixture of iron and cadmium may also be used if desired.

Negative plates may also be constructed in the following manner. The plate frames containing neutral metal webs may be assembled in a cell bare, that is these negative plates have no active metal on them. Finished positive plates, for example, the silver oxide plates hereinbefore described, are assembled in the cell in the usual manner. The alkaline electrolyte used in the cell contains the active material for the negative plate in solution. When the cell is charging this material passes out of solution and is deposited on the negative plate. When the cell is discharging the material thus deposited is dissolved off of the negative plate and returned to the electrolyte as a solution.

From the foregoing it will be obvious that a cell containing plates built in accordance with the teachings of my invention will have many advantages over the product commercially available at the present time. Obviously the continuous ribbons of neutral metal such as nickel are of lower resistance than the similar ribbons formed by pressing a plurality of small flakes of metallic nickel together as is standard practice in the construction of such cells now. This results in a reduction of the internal resistance of the battery and consequently higher discharge rate for a short period of time may be achieved. The low internal resistance of my improved cell is not lost if these ribbons become broken since they will still be bonded at one end to the frame and will afford a better electrical path than the flakes now used. If the web breaks at both ends, it will float in the active material, and even then will impart low resistance to the plate. Furthermore, by depositing the active metal as a thin coat upon these webs and leaving spaces in it into which the electrolyte can penetrate, all of the active material in the plate is in intimate contact with the electrolyte and grid and higher charging and discharging rates of the cell may therefore be achieved. By proper proportioning the thickness of these coatings all of the active material of the plate may be converted to oxide during the charging of the positive plate or reduced from oxide during charging of the negative plate and therefore the battery is operating at a maximum efficiency and a higher watt hour output per pound of plate will be achieved. The good electrical contact between the active material and plate frame is achieved independently of pressure and the life of the plate is therefore greatly enhanced.

Cells of a given ampere hour or watt hour capacity can be made smaller and lighter by my improved process and if such batteries are employed in the propulsion of an electric vehicle, the amount of dead weight no pay load that the vehicle must carry is thereby reduced. By achieving a higher rate of charging and discharging without injury to the plates of the cell I have adapted it to new uses to which nickel alkali iron batteries have been unsuitable heretofore, and the advantages achieved through the use of a cell of this kind may therefore be realized in new fields.

I have found that more than 60% of the area of a plate of given size can be occupied by active material when the plate is constructed in accordance with the teachings of my invention. Contrasted with the usual 25% to 30% of area now present in commercial cells of this type, my improved plate is obviously advantageous.

I have made cells equipped with my improved plates which deliver a much higher rate of current than cells of the same size but containing plates of the usual construction. I have found that the current densities that may be achieved with my plates in an alkali cell, place the capacity of the cell per unit volume on a par with cells of the usual lead-acid battery.

While I have described my invention by illustrating a preferred embodiment of it, I have done so by way of example only as the particular details shown may be greatly modified within the teachings of my invention. I am not therefore to be limited by the express showing made by way of example but rather only by the scope of the appended claims.

Having thus complied with the statutes and shown and described a preferred embodiment of my invention, what I consider new and desire to have protected by Letters Patent is pointed out in the appended claims.

What is claimed is:

1. A storage battery plate comprising a metallic plate frame having a plurality of openings, and a plurality of active material units each comprising a group of spaced ribbons, each ribbon having a thickness of a few ten-thousandths of an inch and carrying active material, and an open unit frame having frame bars supporting said group of spaced ribbons at the ends thereof and at the end ribbons of each group, leaving the edges of the ribbons exposed, said units fitting into the openings of said plate frame with the edges of all of said ribbons unobstructed and said unit frames being bonded to said plate frame to hold the units in place and to establish a low resistance electrical connection with it.

2. A storage battery plate comprising, a metallic plate frame having a plurality of openings, insulating spacers disposed in said openings along their opposite sides and projecting from the opposite lateral faces of said frame, a plurality of active material units each comprising spaced ribbons of active material supported on a unit frame, said units fitting into said openings and against said spacers, and said unit frames being bonded to the plate frame to hold the units and spacers in place in the plate frame and to establish a low resistance electrical connection between the units and plate frame.

3. An active material unit for a battery plate comprising a conducting frame, a plurality of thin metallic ribbons disposed with their widths normal to the plane of the frame, said frame extending along the upper and lower ribbons and along opposite ends of said ribbons and said ribbons being supported on and bonded to said frame, and an active material cathodically deposited on said ribbons, said ribbons being spaced apart to provide for full volume changes in said active material during charge and discharge without developing warping strains in the plate.

4. An active material unit for battery plates comprising a metallic frame, a plurality of thin metallic ribbons having a thickness in the nature of a few ten-thousandths of an inch and spaced apart a distance equal to several times the thickness of the ribbons and disposed in and bonded to said frame, and an active material deposited on said ribbons, said active material deposit being thinner than the distance between adjacent ribbons to render the unit porous to provide clear unobstructed slotted openings through the unit for the free flow of the electrolyte and to accommodate changes in the volume of the active material.

5. An active material unit for battery plates comprising a metallic frame, a plurality of groups of thin metallic ribbons which are spaced uniformly in the groups, serpentine ribbons separating the groups, and an active material deposited on said ribbons and frame, said serpentine ribbons permitting expansion of the groups occasioned by changes of the active material during charging and discharging of the unit.

6. A structure for forming an active material unit for a battery plate comprising a metallic U-shaped frame having opposite sides and a connecting base, a plurality of thin metallic ribbons the ends of which are formed to interfit with the sides of the frame and to slide therealong to positions with open spaces between the ribbons, the interfitting ribbon ends facilitating assembly of the ribbons on the frame in stacked groups by virtue of the slidable relation between the frame and ribbons, said ribbons being adapted to receive active material in the spaces between the ribbons, and the connecting base of said frame furnishing with the sides of the frame a rigid support for said thin ribbons, and a member connecting the sides of said frame opposite the base thereof and serving to secure the assembled ribbons in said frame.

7. An active material unit for battery plates comprising a metallic frame, a plurality of thin metallic ribbons uniformly spaced on and bonded to said frame, and a layer of metal capable of use directly as active material disposed on said ribbons, said layers of metal being of a thickness suitable to prevent the oxidized product thereof from completely filling the space between adjacent ribbon faces.

8. A battery plate unit comprising a U-shaped metallic frame, a plurality of serpentine nickel ribbons in said frame, said ribbons being disposed with alternate crests in each ribbon touching alternate crests in the adjacent ribbon and with the intervening crests of adjacent ribbons spaced apart, and a coating of active material on said ribbons of thickness less than the distance between said intervening crests, the space between the coating on adjacent ribbons making the plate unit porous.

9. A positive plate for storage batteries which use a solution of alkaline electrolyte which comprises, a metal frame, thin ribbons of metallic nickel disposed in said frame with open spaces between the ribbons and bonded to the frame, and a coating of silver on said ribbons, said coating being thinner than the distance between adjacent ribbons to leave open spaces between the coatings after the latter have been oxidized.

10. A positive plate for storage batteries which use alkaline solution as an electrolyte which comprises, a metal frame, thin ribbons of metallic nickel disposed in said frame with open spaces between the ribbons and bonded to the frame, and a coating of electrolytic silver on said ribbons, said coating being thin enough to completely change first to silver oxide and then to silver peroxide as the plate is charged without completely filling said open spaces, and said silver peroxide being completely reduced first to silver oxide and then to metallic silver as the plate is discharged.

11. A structure for use in making battery plates, said structure comprising a plurality of thin strips of soluble metal, each strip having a thin insoluble metallic coating on one side and a soluble enamel coating on the other side, said strips being arranged in superposed relation, said enamel coatings being adapted to be dissolved so as to expose one side of each of said soluble strips so that the latter can be dissolved readily, and said insoluble coatings having the characteristic of remaining in the form of thin spaced ribbons after said strips are dissolved.

12. A battery plate comprising a conducting frame having an opening, an active material unit supported on said frame at said opening, and insulating means disposed in said frame opening between the latter and the active material unit and projecting laterally of the plane of the frame beyond the opposite sides of said active material unit to separate said unit from the active material units of similar frames placed alongside said first frame.

13. A battery plate comprising a conducting frame having a plurality of openings, an active material unit supported on said frame, there being one unit in each of said openings, an insulating means disposed in each of certain of said openings between the associated frame opening and the active material unit disposed therein, said insulating means projecting laterally of the frame beyond the opposite sides of the associated active material units so as to separate the latter from the active material units of similar frames placed alongside the first conducting frame.

14. An active material unit for a battery plate, said unit comprising a metallic U-shaped frame having opposite sides and a connecting base, a plurality of thin metallic ribbons having notched ends fitting over said sides of the frame, thereby providing for the assembly of a number of said ribbons at one time in place on said frame, and means bonding the notched ends of said ribbons to the frame, said ribbons being adapted to receive active material between the ribbons and the connection thereof to said frame furnishing a rigid support for the ribbons.

15. An active material unit for a storage battery plate comprising a metal frame, a plurality of laminated bimetallic webs comprising sections folded at the ends, cooperating means between the folded ends of said webs and the sides of said metal frame for retaining said webs on the frame in assembled position, and active material prepared from one of said bimetallic metals and disposed on said webs with spaces therebetween.

16. A battery plate comprising a connecting frame formed of substantially coplanar material and having at least one opening therein, an active material unit comprising a generally U-shaped frame also formed of coplanar material and a plurality of thin metallic ribbons disposed with their widths normal to the plane of said second frame and having their ends notched to receive the side portions of said second frame, a member connecting the side members of said second frame and serving to hold said metallic ribbons therein, and means securing said second frame to said first frame with the thin metallic ribbons disposed in the opening in the first frame and with said second frame disposed flat against the portions of said first frame surrounding the opening therein.

17. A battery plate comprising a connecting frame formed of substantially coplanar material and having at least one opening therein, an active material unit comprising a generally U-shaped frame also formed of coplanar material and a plurality of thin metallic ribbons disposed with their widths normal to the plane of said second frame and having their ends notched to receive the side portions of said second frame, a member connecting the side members of said second frame and serving to hold said metallic ribbons therein, means securing said second frame to said first frame with the thin metallic ribbons disposed in the opening in the first frame and with said second frame disposed flat against the portions of said first frame surrounding the opening therein, and transversely disposed separating insulators disposed in the opening in the plate frame and being notched to receive portions of the plate frame, the active material unit frame serving to hold said separating insulators in place.

18. A storage battery plate comprising a metallic plate frame having a plurality of openings, a plurality of active material units each comprising a group of spaced ribbons carrying active material, the thickness of each ribbon being in the nature of a few ten-thousandths of an inch, an open unit frame comprising frame bars supporting said group of spaced ribbons at the ends thereof leaving the edges of the ribbons exposed, said units fitting into the openings in said plate frame with the edges of all of said ribbons unobstructed and said unit frames being bonded to the plate frame to hold the unit in place and to establish a low resistance electrical connection with it.

19. A storage battery plate comprising a metallic plate frame having a plurality of openings, insulating spacers disposed in said openings along their opposite sides and projecting from the opposite lateral faces of said frame, a plurality of active material units fitting into said openings and against said spacers, and said unit frames being secured to the plate frame to hold the units and spacers in place in the plate frame and to establish a low resistance electrical connection between the units and plate frame.

20. A battery plate comprising a connecting frame formed of substantially coplanar material and having at least one opening therein, an active material unit comprising a generally U-shaped frame also formed of coplanar material and a plurality of thin metallic ribbons disposed with their widths normal to the plane of said second frame and having their ends notched to receive the side portions of said second frame and fastened thereto, and means securing said second frame to said first frame with the thin metallic ribbons disposed in the opening in the first frame and with said second frame disposed flat against the portions of said first frame surrounding the opening therein.

21. A battery plate comprising a conducting frame formed of substantially coplanar material and having at least one opening therein, an active material unit comprising a frame also formed of coplanar material and a plurality of thin metallic ribbons disposed with their widths normal to the plane of said second frame and having their ends formed to interengage with the side portions of said second frame, means securing said second frame to said first frame with the thin metallic ribbons disposed in the opening in the first frame and with said second frame disposed flat against the portions of said first frame surrounding the opening therein, and transversely disposed separating insulators disposed in the opening in the plate frame and being notched to receive portions of the plate frame, the active material unit frame serving to hold said separating insulators in place.

22. A ribbon for storage battery plates comprising laminated metals and a coating of enamel adapted to cause spacing between assembled ribbons on a frame.

23. A structure for use in making storage battery plates, said structure comprising a metallic frame, laminated metallic ribbons on said frame in spaced relation, said ribbons comprising three different metals, one serving as a conducting and supporting ribbon, and the other two as active material bases.

24. A storage battery plate comprising a metallic frame having a plurality of openings, a plurality of active material units, each comprising a group of spaced ribbons carrying active material, an open unit frame comprising frame bars supporting said group of spaced ribbons so as to leave the edges of the ribbons exposed, said units fitting into the openings of said plate frame with the edges of all of said ribbons unobstructed, and means securing said unit frames to said metallic frame to establish a low electrical resistance connection therebetween.

JAMES G. ZIMMERMAN.